Figure 1:
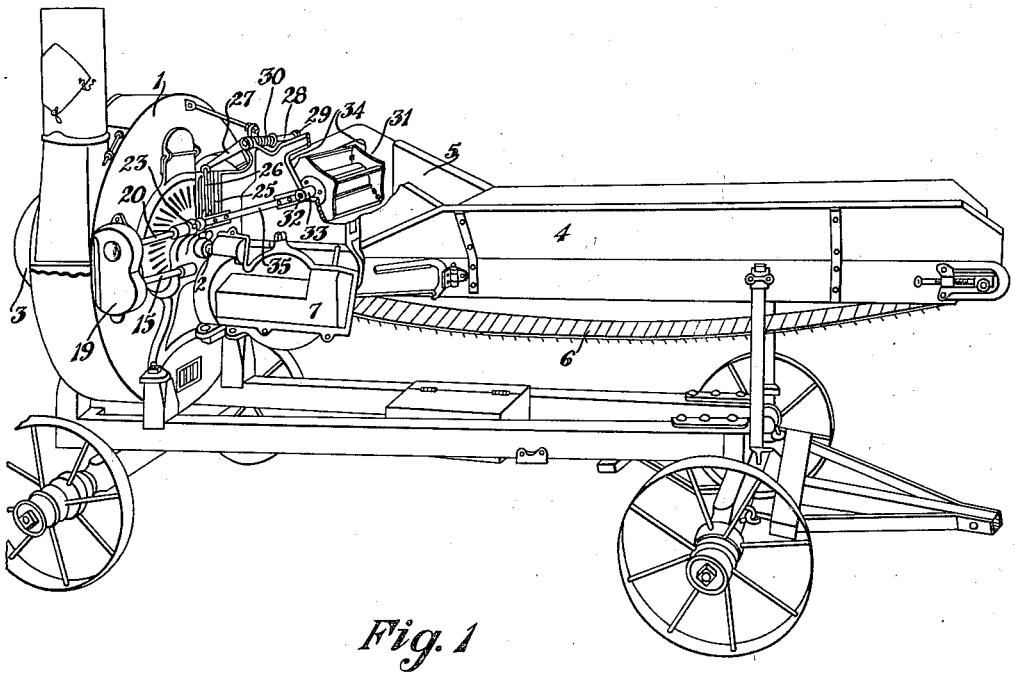

June 22, 1937.　　　V. MATEJCIK　　　2,084,447
FODDER CUTTER AND ACCUMULATING ROLL THEREFOR
Filed Oct. 31, 1935　　　4 Sheets-Sheet 1

Inventor
Vincent Matejcik
Attorneys

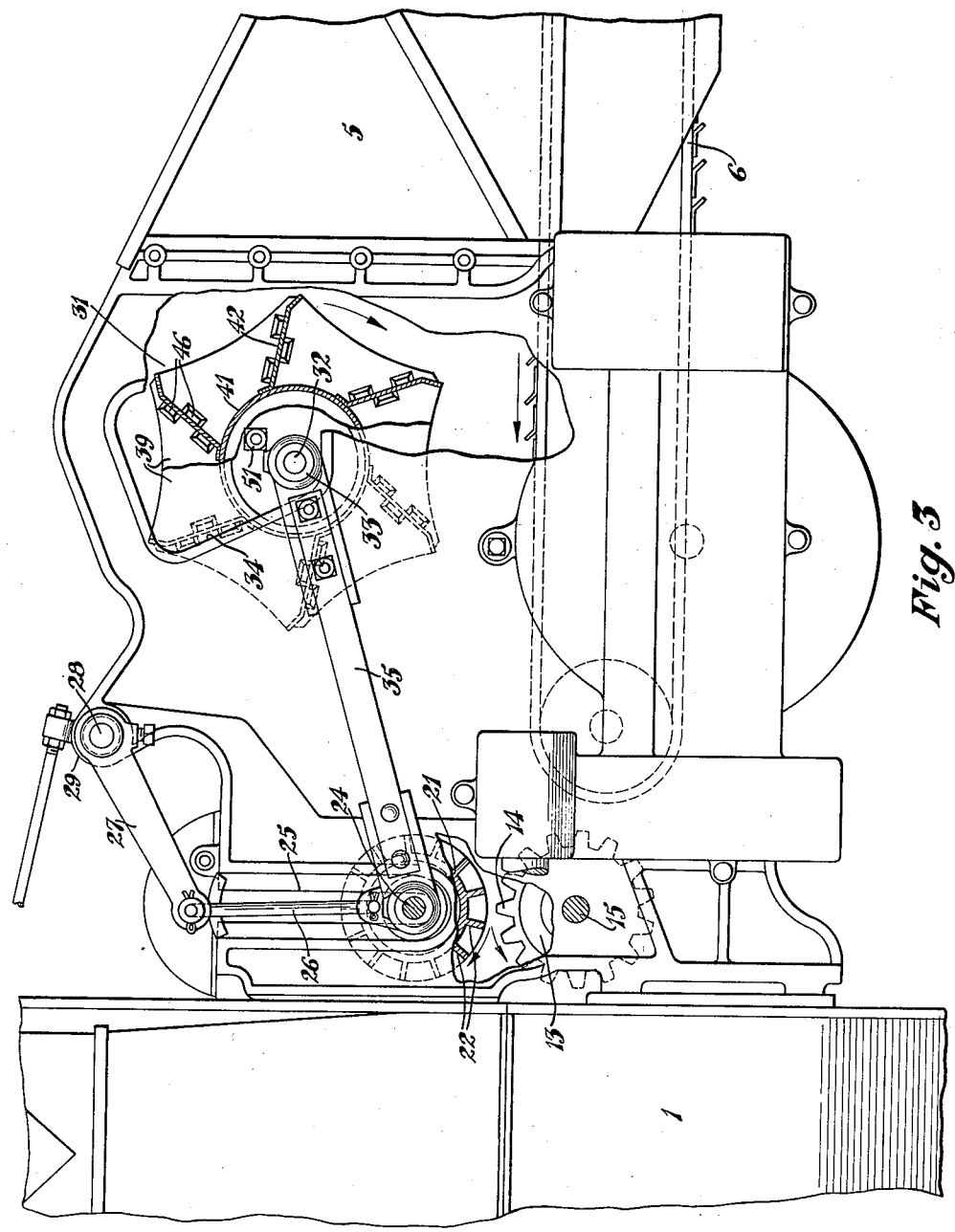

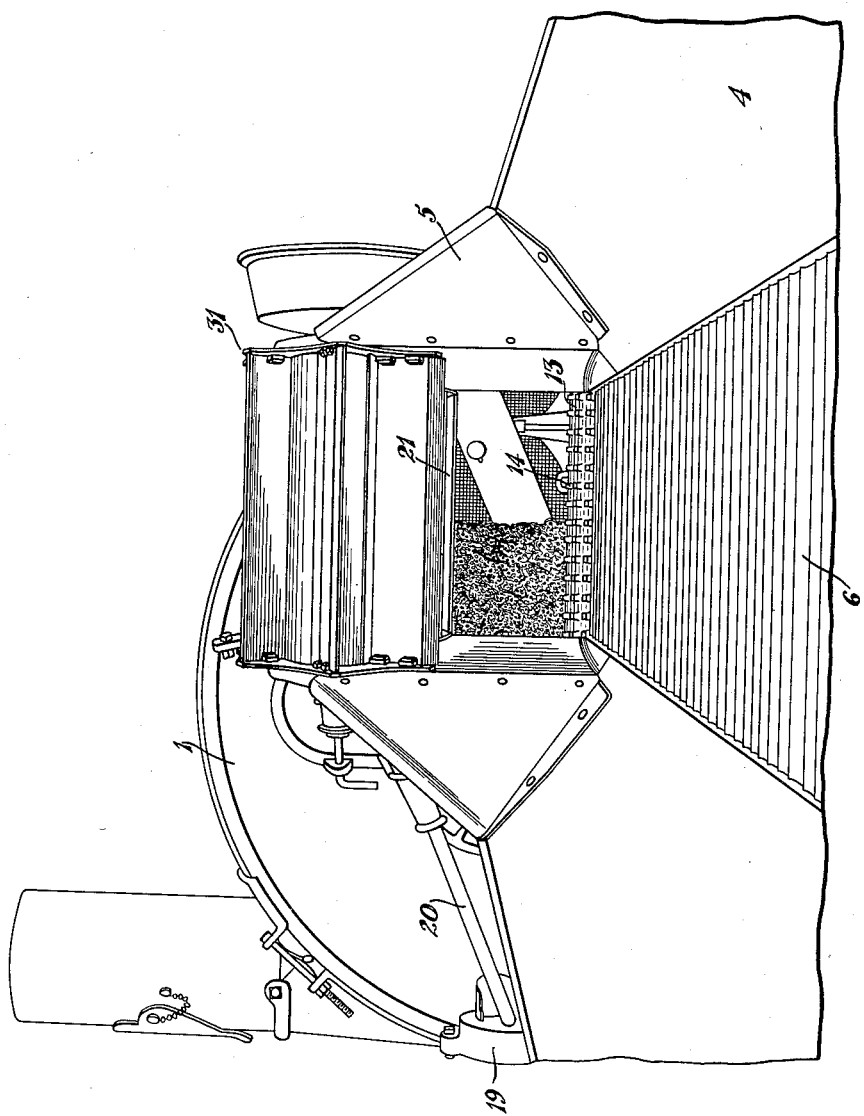

Patented June 22, 1937

2,084,447

UNITED STATES PATENT OFFICE 2,084,447

FODDER CUTTER AND ACCUMULATING ROLL THEREFOR

Vincent Matejcik, Canton, Ohio, assignor to Blizzard Manufacturing Company, Canton, Ohio, a corporation of Ohio Application October 31, 1935, Serial No. 47,659

4 Claims. (Cl. 146—109)

My invention relates to fodder cutters adapted for feeding and cutting relatively long stalks of vegetation and their appendages.

In recent years it has become the practice to cut for cattle feed not only coarser stalks such as corn stalks, but also fine stalks such as hay.

It is virtually essential that a fodder cutter, as exemplified in U. S. Letters Patent No. 1,625,194, issued to Joseph Dick, deceased, should include an accumulating or gathering roll cooperating with the feed trough, feed hopper, and feed rolls, to gather in overhanging or upstanding stalks for delivering the same into the feed rolls.

Usual fodder cutters with feed mechanism adapted for handling corn stalks have not been suitable for handling finer vegetation such as hay, because the usual accumulating roll for a fodder cutter primarily intended for cutting corn stalks is of such construction that finer stalks such as hay wind up or become entangled with the accumulator roll parts and about the ends thereof causing a clogging and stopping of the feed mechanism.

Consequently, it has been necessary to provide a separate and special fodder cutter having a special feed mechanism which may include rotating spikes for users desiring to cut the finer vegetation, such as hay, thus necessitating a double investment for a hay cutter and a corn cutter.

The objects of the present invention include the provision of a fodder cutter having feed mechanism adapted for handling fine as well as coarse stalks of vegetation and their appendages.

More particular objects of the present invention include the provision of an improved fodder cutter having an improved accumulating roll adapted for handling fine as well as coarse stalks of vegetation.

The foregoing and other objects are attained by the fodder cutter, accumulator roll, apparatus, parts, improvements, combinations, and sub-combinations, which comprise the present invention, and the nature of which is set forth in the following general statement, and preferred embodiments of which, together with their mode of use are set forth in the following description, and which are particularly and distinctly pointed out and set forth in the appended claims forming part hereof.

The nature of the present invention may be stated in general terms as including in feed apparatus for a fodder cutter and the like, and adapted for feeding relatively long ranging from fine to coarse stalks of vegetation and their appendages, a feed trough, endless belt conveyor means operating in the bottom of the trough, feed means operating at one end of the trough upon stalks and their appendages delivered thereto by the conveyor means, and an improved accumulator roll operating above the conveyor means in advance of the feed means, and the accumulator roll being drive rotated and mounted for movement towards and away from the conveyor means and upon the stalks and their appendages passing between the accumulator roll and the conveyor.

According to the present improvements the accumulator roll includes end plates, an axial tube extending between the end plates, and blades extending outwardly from the tube and between the end plates. Each end plate has a multi-sided periphery and salient corners between the sides thereof.

Each blade is preferably transversely concave and the concave faces of the blades open in the direction of rotation of the roll, and the outer longitudinal edge of each blade extends between opposite salient corners of the end plates.

The accumulator roll is preferably made of separate axial tube, end plates, and blades, which are assembled and held together by means of one or more tie rods extending through the axial tube and being secured at opposite ends to the end plates, the end plates serving to clamp the opposite ends of the tube and blades.

Figures 5, 6:
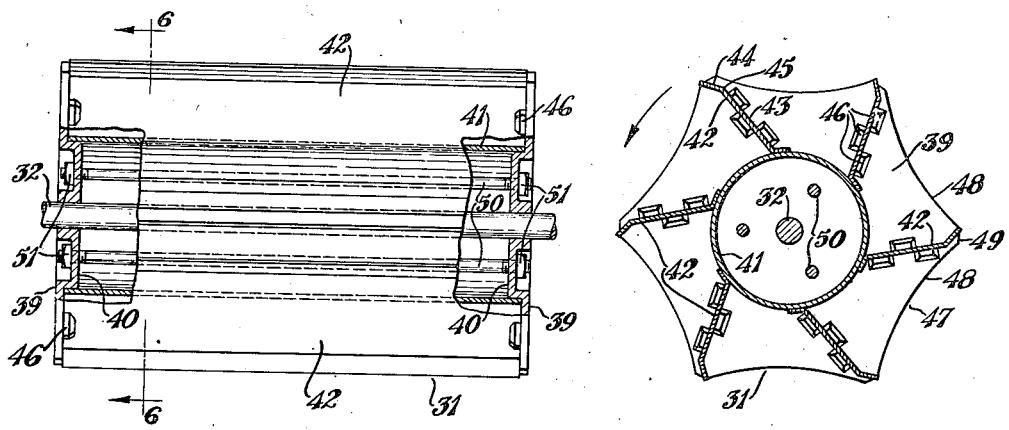
Figure 2:
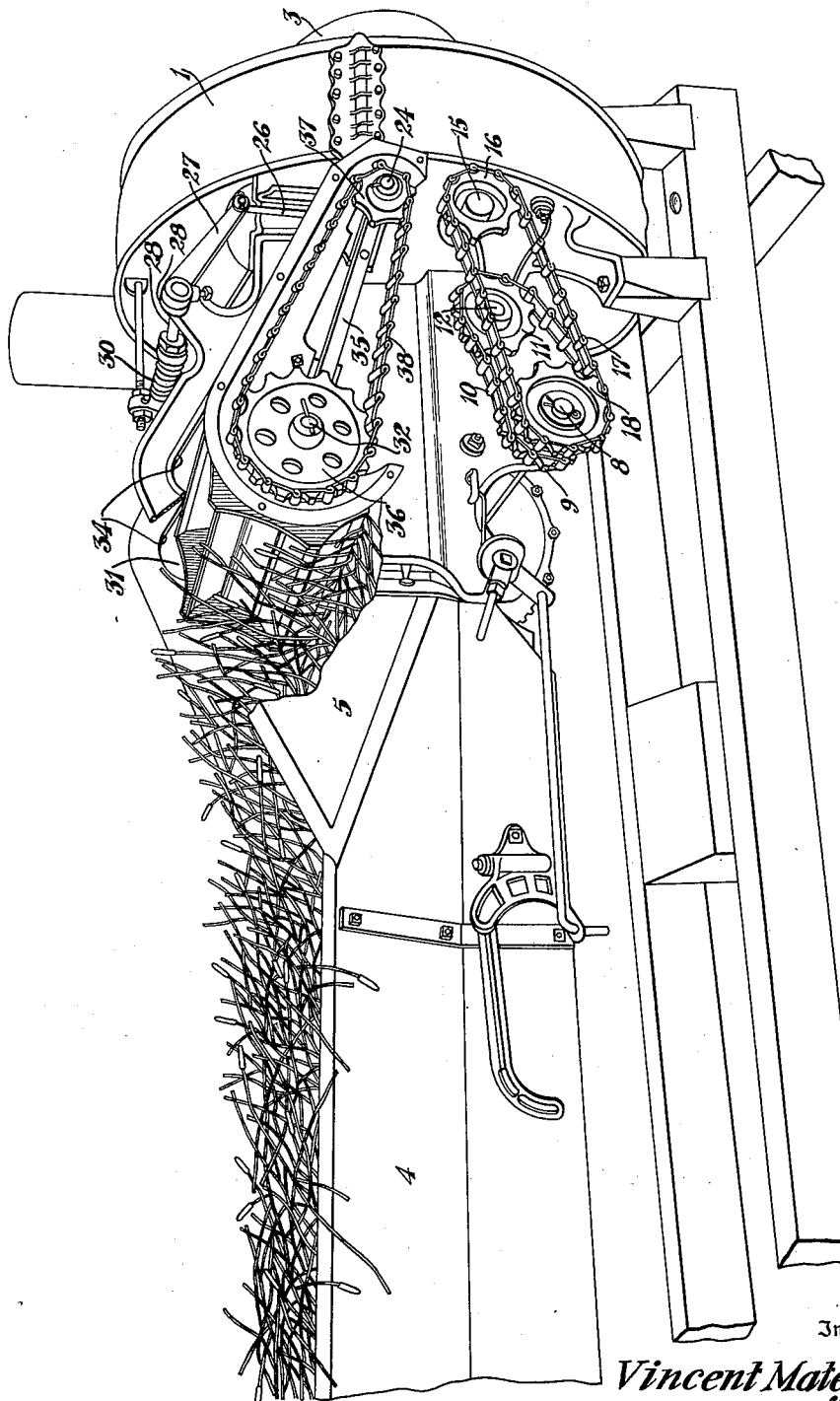

By way of example, preferred embodiments of the present improvements are illustrated in the accompanying drawings forming part hereof, in which Figure 1 is a fragmentary perspective view of a fodder cutter provided with the present improvements;

Fig. 2, an enlarged fragmentary perspective view of the opposite side of the feed mechanism of the fodder cutter;

Fig. 3, an enlarged fragmentary side elevation of the feed mechanism of the fodder cutter showing the same side of the machine as Fig. 1;

Fig. 4, a fragmentary perspective view of the fodder cutter looking towards the improved accumulator roll and associated parts;

Fig. 5, a detached elevation of one of the improved accumulator rolls; and

Fig. 6, a transverse sectional view thereof as on line 6—6, Fig. 5.

Similar numerals refer to similar parts throughout the drawings.

The fodder cutter includes a case 1 having the usual cutting and blowing mechanism therein, rigidly mounted on the main shaft 2, which is axially journalled in the case and driven from any source of power through the drive pulley 3, and a feed trough 4 and feed hopper 5, having an endless conveyor belt 6 therein.

Suitable gearing within the gear housing 7 transmits power from the main shaft 2 to the feed drive shaft 8, a sprocket wheel 9 thereon being operatively connected as by the chain 10 to a sprocket wheel 11 upon the conveyor apron drive shaft 12.

The lower feed roll 13, which may be provided with the spikes or teeth 14 is journalled in stationary bearings within the throat of the feed hopper, the shaft 15 thereof being provided with a sprocket wheel 16 to receive power as through the chain 17, from the sprocket wheel 18 upon the drive shaft 8.

The shaft 15 of the lower feed roll extends beyond the other side of the feed hopper into a gear housing 19 within which is mounted suitable gearing to transmit power to the radially movable shaft 20 of the upper feed roll 21 which may be provided with the radial blades or paddles 22. A universal joint 23 connects the shaft 20 with the shaft 24 of the upper feed roll which shaft is mounted in bearings vertically movable within the guides 25 formed in the side walls of the feed hopper.

A link 26 connects each of the bearings of the shaft 24 with a rocker arm 27 carried by the rocker shaft 28 journalled in bearings 29 above the feed hopper, a coil spring 30 upon said shaft tending to normally urge the rocker arms 27 downward to move the upper feed roll toward the lower feed roll.

The upper and lower feed rolls 14 and 13 with their driving connections as above described constitute feed means operating at one end of the trough 4, and the endless belt conveyor means 6 operates in the bottom of the trough 4.

The present improved accumulating or gathering roll, which may be termed an accumulator roll, is indicated generally at 31, and is provided with a shaft 32 journalled in bearings 33.

The bearings 33 are mounted for movement in quadrilateral openings 34 provided in the sides of the feed hopper 5, and which may be in the form of trapeziums, as shown.

Each of the bearings 33 is connected by a link 35 with the shaft 24 of the upper feed roll 21, thus permitting movement of the shaft 32 within the limits of the openings 34 and about the axis of the upper feed roll 21 irrespective of its upward and downward movements, and the shaft 32 and the accumulator roll 31 thereon is thus movable towards and away from the belt conveyor means 6.

The improved accumulator roll 31 is drive rotated as shown by providing a sprocket wheel 36 upon one end of the shaft 32, and a sprocket wheel 37 on the upper feed roll shaft 24, and an endless chain 38 operatively drive connecting the sprocket wheels 36 and 37.

The several rolls are thus positively driven in the direction of the arrows shown in Fig. 3.

For the purposes of the present improvements, the improved accumulator roll 31 includes two end plates 39, each longitudinally spaced from the other on the shaft 32 which extends through central hub apertures in the end plates 39, and each end plate 39 being secured near one of the ends of the shaft 32.

Each end plate 39 is provided with a central cylindric boss 40 extending towards the boss 40 of the other end plate, and a preferably cylindric axial tube 41 extends between the end plates, and the cylindric bosses 40 fit in the opposite ends of the axial tube 41, as best shown in Fig. 5.

A plurality of blades 42 extend outwardly from the tube 41 and between the end plates.

Each blade 42 is preferably concave and the concave faces of the blades open in the direction of rotation of the roll, and as shown, each blade has a central leg or web portion 43, an inner foot portion 44 abutting against the outer surface of the tube 41 and angular to the leg or web portion 43, and each blade 42 also includes an outer foot portion 44 angular with respect to the leg portion 43 and joining the same at an apex ridge 45 extending longitudinally between the end plates, as best shown in Fig. 6, whereby the concave formation of the blades 42 is attained.

Each end plate preferably has formed thereon to interfit with the adjacent end of each blade 42 a set of lugs 46 spaced from each other so as to receive and fit the adjacent end of one of the blades 42.

For the purposes of the present improvements, as best shown in Fig. 6, each end plate has a multi-sided periphery indicated generally by 47 including a plurality of preferably outwardly concave sides 48 with salient corners 49 between the adjacent ends of the concave sides 48.

The end plates 39, the axial tube 41, and the blades 42, are preferably assembled and held together by means of tie rods 50 extending through apertures provided in the end plates and having nuts 51 screwed on threaded ends of the tie rods 50 so as to clamp the end plates 39 against the opposite ends of the tube 41 and blades 42.

The construction and arrangement of the improved accumulator roll 31 as above set forth permits the operation of the improved fodder cutter provided with the improved accumulator roll 32 in the usual manner for feeding relatively long ranging from fine to coarse stalks of vegetation and their appendages to the cutting and blowing mechanism.

In connection with the relatively fine stalks of vegetation, such as hay, the improved construction and arrangement of the accumulator roll is such that the hay cannot wind either around the blades or become entangled with the blades or the end plates, or between the end plates and the trough sides.

The blades being transversely concave and opening in the direction of rotation of the roll provide for the necessary accumulating and gathering action without binding, of the entire range of feed material which it is desired under present day practice to cut into fodder.

It will be noted that in the illustrated form of the improved accumulator roll 31, the number of blades is six, providing a relatively wide radial spacing of the blades, and the radius of the tube 41 is substantially one-half the distance from the axis of rotation of the roll 31 to the outer tips of the blades, providing relatively large accumulating pockets between the blades and the end plates.

In the operation of the improved accumulator roll 31, the relatively widely spaced blades climb upon the vegetation passing thereunder, and do not bind in any manner.

I claim:

1. In feed apparatus for a fodder cutter and the like and adapted for feeding relatively long ranging from fine to coarse stalks of vegetation and their appendages, a feed trough, endless belt conveyor means operating in the bottom of the trough, feed means operating at one end of the trough upon stalks and their appendages delivered thereto by the conveyor means, and an accumulator roll operating above the conveyor means in advance of the feed means, the accumulator roll being drive rotated and mounted for movement towards and away from the conveyor means and upon the stalks and their appendages passing between the accumulator roll and the conveyor, and the accumulator roll including end plates, an axial tube extending between the end plates, and blades extending outwardly from the tube and between the end plates, each blade having an inner leg portion and an outer foot portion angular with respect to each other and joining each other at an apex ridge extending longitudinally between the end plate, each end plate having a multi-sided periphery and salient corners between the sides thereof, the outer longitudinal edge of each blade extending between opposite salient corners of the end plates.

2. In feed apparatus for a fodder cutter and the like and adapted for feeding relatively long ranging from fine to coarse stalks of vegetation and their appendages, a feed trough, endless belt conveyor means operating in the bottom of the trough, feed means operating at one end of the trough upon stalks and their appendages delivered thereto by the conveyor means, and an accumulator roll operating above the conveyor means in advance of the feed means, the accumulator roll being drive rotated and mounted for movement towards and away from the conveyor means and upon the stalks and their appendages passing between the accumulator roll and the conveyor, and the accumulator roll including end plates, an axial tube extending between the end plates, and blades extending outwardly from the tube and between the end plates, each blade being transversely concave, and the concave faces thereof opening in the direction of rotation of the roll, each end plate having a multi-sided periphery and salient corners between the sides thereof, the outer longitudinal edge of each blade extending between opposite salient corners of the end plates.

3. An accumulator roll for feed apparatus for a fodder cutter and the like, including end plates, an axial tube extending between the end plates, and blades extending outwardly from the tube and between the end plates, each blade having an inner leg portion and an outer foot portion angular with respect to each other and joining each other at an apex ridge extending longitudinally between the end plate, each end plate having a multi-sided periphery and salient corners between the sides thereof, the outer longitudinal edge of each blade extending between opposite salient corners of the end plates.

4. An accumulator roll for feed apparatus for a fodder cutter and the like, including end plates, an axial tube extending between the end plates, and blades extending outwardly from the tube and between the end plates, each blade being transversely concave, and the concave faces thereof opening in the direction of rotation of the roll, each end plate having a multi-sided periphery and salient corners between the sides thereof, the outer longitudinal edge of each blade extending between opposite salient corners of the end plates.

VINCENT MATEJCIK.